US009218541B1

(12) United States Patent
Johnson

(10) Patent No.: US 9,218,541 B1
(45) Date of Patent: Dec. 22, 2015

(54) IMAGE GRID SYSTEM AND METHOD

(71) Applicant: Alwyn Patrice Johnson, Englewood, CO (US)

(72) Inventor: Alwyn Patrice Johnson, Englewood, CO (US)

(*) Notice: Subject to any disclaimer, the term of this patent is extended or adjusted under 35 U.S.C. 154(b) by 88 days.

(21) Appl. No.: 13/872,035

(22) Filed: Apr. 26, 2013

Related U.S. Application Data

(60) Provisional application No. 61/638,742, filed on Apr. 26, 2012.

(51) Int. Cl.
*G06K 9/68* (2006.01)
*G06K 9/62* (2006.01)

(52) U.S. Cl.
CPC ................................. *G06K 9/6202* (2013.01)

(58) Field of Classification Search
USPC .......................................................... 382/218
See application file for complete search history.

(56) References Cited

U.S. PATENT DOCUMENTS

| | | | | |
|---|---|---|---|---|
| 8,332,782 | B1* | 12/2012 | Chang et al. | 715/853 |
| 2011/0055683 | A1* | 3/2011 | Jiang | 715/234 |
| 2012/0210200 | A1* | 8/2012 | Berger et al. | 715/202 |
| 2014/0363143 | A1* | 12/2014 | Dharssi et al. | 386/282 |

OTHER PUBLICATIONS

Above Documents U, V and W Are Part of Office Action and Are Contained Therein.*

Alex Chitu, Webcams Layer in Google Maps, Apr. 16, 2009, Retrieved from Internet, Retrieved on Dec. 17, 2014 from URL:<http://googlesystem.blogspot.com/2009/04/webcams-layer-in-google-maps.html>.*

Philipp Hirtz, Visit before you visit, Wednesday, Jul. 9, 2008, Retrieved from the Internet on Dec. 17, 2014 from URL:<http://google-latlong.blogspot.com/2008/07/visit-before-you-visit.html>.*

Cooperation of Webcams.travel With Google Maps, Thursday, Apr. 16, 2009, Retrieved from the Internet on Dec. 17, 2014 from URL:<http://blog.webcams.travel/2009/04/cooperation-of-webcamstravel-with.html>.*

* cited by examiner

*Primary Examiner* — Gregory F Cunningham
(74) *Attorney, Agent, or Firm* — Oppedahl Patent Law Firm, LLC; Aileen Law

(57) ABSTRACT

An image grid system is provided that includes a network manager device and a database. The network manager device is configured to communicatively connect to an interface device and to receive images. The network manager device includes a relational component and a grid generation component. The relational component is configured to determine at least one relationship among two or more images from the interface device and analyze the two or more images to associate at least one character of the images. The grid generation component is configured to generate an image grid with a plurality of viewpoints about the image grid and populate the viewpoints with the two or more images based on the determined relationship and association of the two or more images. The grid generation component is further configured to generate a display of the image grid. The database is communicatively connected to the network manager device. The database stores the images, image relationships, image associations and/or image parameters.

20 Claims, 10 Drawing Sheets

IMAGE GRID SYSTEM AND METHOD

CROSS-REFERENCE TO RELATED APPLICATIONS

This application claims priority under 35 U.S.C. 119(e) to U.S. Patent Application No. 61/638,742, filed on Apr. 26, 2012. The entire disclosure of U.S. Patent Application No. 61/638,742 is hereby incorporated herein by reference.

FIELD

The field relates to an image grid system and method. More particularly the field relates to an image grid system and method for viewing images.

BACKGROUND OF THE INVENTION

Sharing electronic images captured by image capturing devices is becoming increasingly popular. The images are captured or recorded with various image capturing devices and uploaded to a database or shared directly between image capture devices of users. The captured images are from different angles, heights and distances. The captured images lack an order or relationship when sharing. Thus, those viewing the shared images may not fully appreciate an experience at the location(s) of the images.

SUMMARY OF INVENTION

An image grid system is provided that includes a network manager device and a database. The network manager device is configured to communicatively connect to an interface device and to receive images. The network manager device includes a relational component and a grid generation component. The relational component is configured to determine at least one relationship among two or more images from the interface device and analyze the two or more images to associate at least one character of the images. The grid generation component is configured to generate an image grid with a plurality of viewpoints about the image grid and populate the viewpoints with the two or more images based on the determined relationship and association of the two or more images. The grid generation component is further configured to generate a display of the image grid. The database is communicatively connected to the network manager device. The database stores the images, image relationships, image associations and/or image parameters.

A method is provided that includes receiving a plurality of images from an image capture device; determining at least one relationship among two or more of the images; analyzing the two or more images to associate at least one characteristic of the two or more images; generating an image grid with a plurality of viewpoints about the image grid; and populating the viewpoints with the two or more images based on the determined relationship and association of the two or more images.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
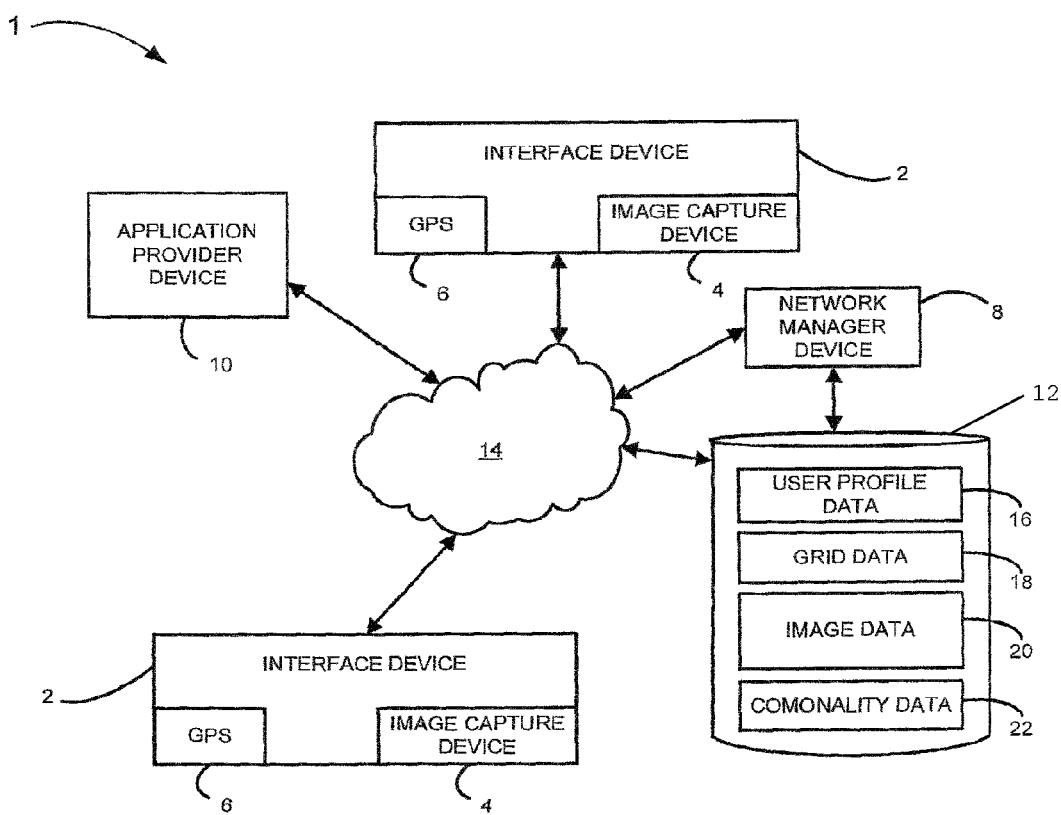
FIG. 1 is a block diagram of an image grid system according to an embodiment of the invention.

Referring now to FIG. 1, a block diagram depicts the details of a web-based image grid system 1 in accordance with an embodiment of the instant invention. The system 1 includes multiple interface devices 2, each having an image capture device 4 and a GPS device 6, a network manager device 8, one or more application provider devices 10 and a database 12.

The interface devices 2, the network manager device 8, the application provider device 10 and the database 12 are communicatively connected through a network 14. The network 14 can include, by way of example, Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 14 may also include optical communications. Other conventional and/or later developed wired and wireless networks may also be used.

The image capture device 4 can be separate from the interface device 2 or can be integral with the interface device 2. The image capture device 4 captures images and provides access to the images to the interface device 2. Images, as used herein, is intended to mean pictures and/or video content including sound for replay with the video content. Multiple images may be taken with various types of lenses and combined to create a 3-D effect.

The interface device 2 is a user interface for a user that preferably provides a graphic user interface for the user to control the capturing of images as well as sending and receiving images via the network 14. The user can be a member of a social networking site.

The interface device 2 sends and receives images via the network 12. The network manager device 8 hosts various processing and website hosting capabilities. The interface device 2 can download an application that provides the graphical user interface for capturing and sending images as well as communication with the network manager device 8. The interface device 2 can download the application from the network manager device 8 and/or the application provider device 10.

Examples of the interface device 2 include an IPHONE or IPAD device by Apple, Inc., a mobile electronic device powered by ANDROID by Google, Inc., a BLACKBERRY device by Research In Motion Limited, a mobile electronic headset/eye-wear device and a mobile electronic tablet device from MICROSOFT. Other types of mobile electronic devices may be used, such as an ALPR camera.

In some embodiments, a mobile application may be downloaded, installed, and launched on the interface device 2 to enable the user to receive, send and display messaging, and forward images. The mobile application may take advantage of hardware and/or software functionality provided by manufacturers of the interface 2 device. For example, the mobile application may use the SAFARI web browser on the IPHONE device, the webkit browser on an ANDROID device, MOBILE INTERNET EXPLORER on a WINDOWS MOBILE device. The mobile application may use imaging or messaging functionality on any of the aforementioned devices. The mobile application may include instructions that when executed on the interface device 2 cause a machine to change its state or perform tasks within the machine and with other machines.

The mobile application may be downloaded from the application provider device 10 or from the network manager device 8. In general, the application provider device 10 is operated by an application provider that makes available mobile applications created by the application provider and/or third parties (e.g., the network manager) for download and use on mobile electronic devices. Examples of application providers include Apple, Inc. through its operation of ITUNES STORE, Google, Inc. through its operation of ANDROID MARKET, AT&T through its operation of its APPCENTER, and Research In Motion Limited through its operation of BLACKBERRY APP WORLD.

The network manager device 8 is in communication directly (e.g., through local storage) and/or through the network 14 (e.g., in a cloud configuration or software as a service) with the database 12. The database 12 may store user profile data 16, grid data 18, image data 20 and commonality data 22.

The user profile data 16 includes information regarding user profiles created by the user at the social networking site hosted by the user. The user profile data 16 includes, by way of example, user preferences, user name, user password, demographic information, email address, twitter address, etc.

The grid generation data 18 includes information regarding the generation of different shaped grids. The grid generation data 18 includes, by way of example, information for generating differently shaped grids. The shapes of the grids may be generated based on user preferences or predefined shape based on location of the target object. The grid generation data 18 includes measurements, seating arrangements of event locations, coordinates, etc.

The image data 20 includes information regarding the captured images. The image data 20 stores captured images uploaded by the users.

The commonality data 22 includes information regarding shared same or similar characteristics of the captured images. The commonality data 22 includes, by way of example, time and date of when images were captured, geolocation coordinates of the image capture device 4, altitude of image capture device 4, target object, event or any other characteristics of the captured image and the target object that may facilitate grouping captured images with the same or similar characteristics.

Certain data from the database 12 can be stored on the interface device 2 separated from the or in addition to the data stored in the database 12. In some embodiments, certain data may be stored on the interface device 2 instead of in the database 12. In some embodiments, the interface device 2 is pre-loaded with certain data.

While the image grid system 1 of FIG. 1 is shown to include single devices, multiple devices may be used. The devices may be the same type of device or may be different device types. When multiple devices are present, the multiple devices may be of the same device type or may be a different device type. Moreover, system 1 shows a single network 14; however, multiple networks can be used. The multiple networks may communicate in series with each other to link the devices or in parallel to link the devices.

Figure 2:
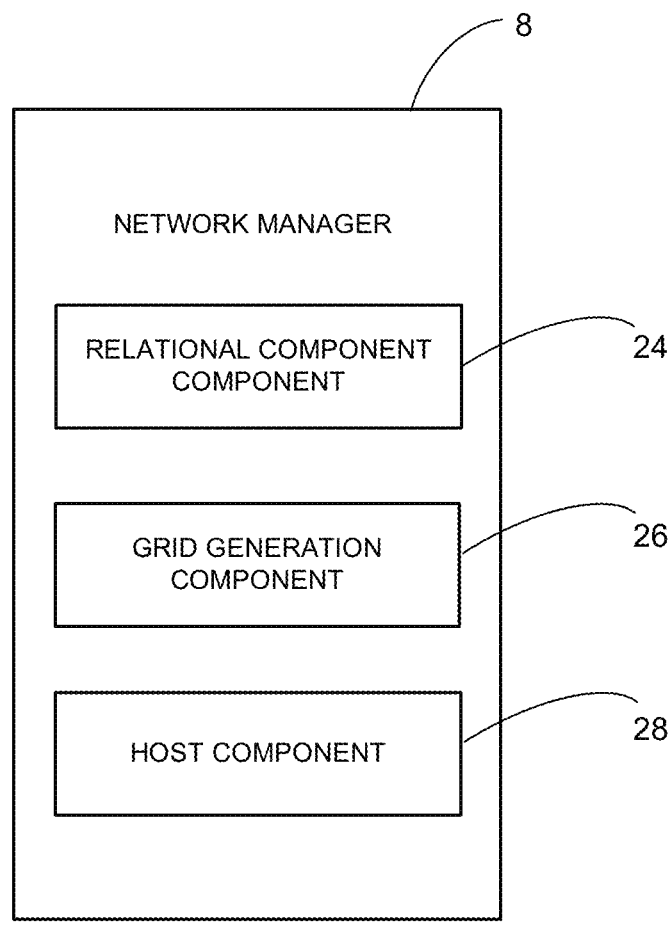
FIG. 2 is a block diagram of a network manager device of the image grid system of FIG. 1 according to an embodiment of the invention.

Referring to FIG. 2, the network manager device 8 can be used by a person or business entity (e.g. the network manager company) to generate the image grid and host a social networking site. The network manager 8 includes a relational component 24, a grid generation component 26 and a host component 28. The components 24, 26 and 28 are communicatively connected; the communicative connection may be wireless or wired.

The relational component 24 enables the network manager device 8 to determine relationships among the captured images, such as the same or similar shared characteristics. The relational component 24 further enables the network manager device 8 to group, categorize or sort the captured images for display via the image grid.

The grid generation component 26 enables the network manager device 8 to generate the image grid with uploaded captured images.

The host component 28 enables the network manager device 8 to host a social networking site with user profiles, messaging capability, image tagging capability, commenting capability, etc.

Figure 3:
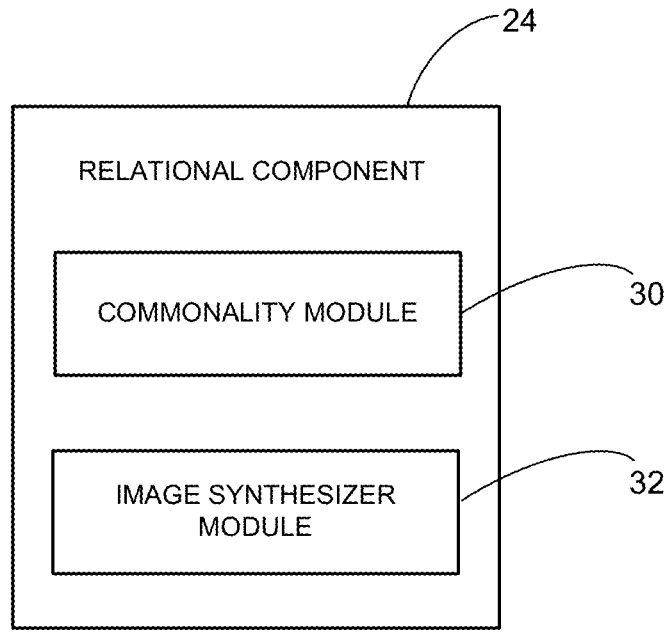
FIG. 3 is a block diagram of a relational component of the network manager device of FIG. 2 according to an embodiment of the invention.

FIG. 3 illustrates the relational component 24 according to an example embodiment. The relational component 24 includes a commonality module 30 and an image synthesizer module 32. The commonality module 30 sorts or classifies uploaded images from the interface devices 2 into groups or categories based on image parameters. Image parameters are characteristics that can include time, date, geocoordinates, altitude, target object, magnification, type of image capture device 4, etc. The geocoordinates can include latitude coordinates, longitude coordinates and/or altitude from GPS, for example. The image parameters are preferably embedded in the image but may be accessed from other sources, such as the user profile data 16 (for manual entry by the user). GPS coordinates may be acquired from the GPS device 6, combined with the image from the image capture device 4 and sent to the network manager device 8 to provide image parameters for the commonality module 30. The commonality module 30 can include image analysis to spot images with target objects in common. The commonality module 30 classifies and labels the uploaded images that have image parameters in common and can store the commonality information in the commonality data 22.

The image synthesizer module 32 analyzes images classified or labeled as having image parameters in common (e.g. common target object and time period) to determine fringe or edge relationships. The image synthesizer module 32 applies multiple image modification techniques at fringes and edges to create visual effects on the classified images. Edges of images may be analyzed by the image synthesizer module 32 to determine regions within edges or fringes that are in common with other images so as to match/connect/link the edges of the images sharing common image parameters. The image synthesizer module 32 may classify and label the images according to the results of the image analysis. The grid generation component 26 utilizes the analysis by the commonality module 30 and the image synthesizer module 32 to shape the grid and populate the grid with images.

Figure 4:
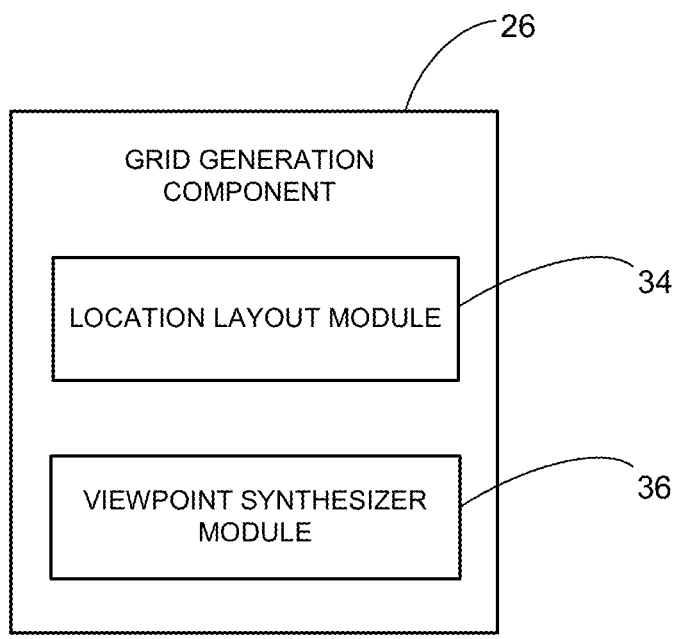
FIG. 4 is a block diagram of a grid generation component of the network manager device of FIG. 2 according to an embodiment of the invention.

FIG. 4 illustrates the grid generation component 26 according to an example embodiment. The grid generation component 26 includes a location layout module 34 and a viewpoint synthesizer module 36.

The location layout module 34 determines the shape of an image grid 38. The location layout module 34 shapes the image grid 38 according to one or more user preferences and/or according to an environment in which the target object is located. The environment can be a surrounding environment or a characteristic of the environment. For example, the user may have a user preference for a cube shaped, single-layer planar, or spherical grid. Such user preference(s) can be stored in the user profile data 16. The location layout module 34 can access the commonality data 22, specifically location data, to shape the image grid 38 based on the commonality data 22. For example, in an environment in which bleachers face the target object, the location layout module 34 shapes the image grid 38 so as to have a downward sloping perimeter, e.g., an inverted frustro-conical or inverted pyramid shape. The shapes of image grids 38 can be predefined according to location of the target object and stored at the grid data 18. Locations of popular target objects and the assigned predefined shapes of the image grids can also be stored at the grid data 18.

Figure 5:
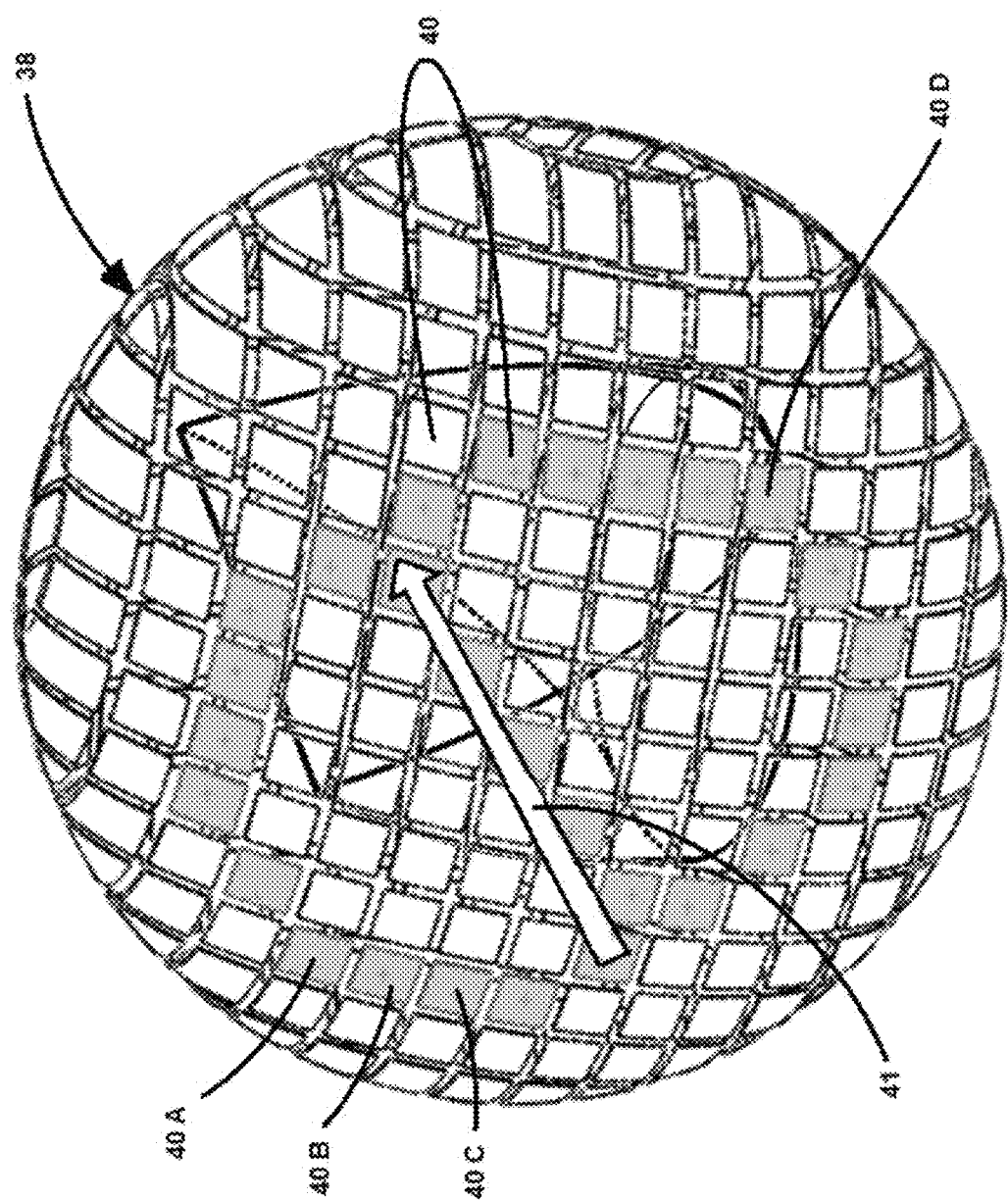
FIG. 5 is a perspective view of a spherical image grid of the image grid system and method according to an embodiment of the present invention.

Referring to FIG. 5, the image grid 38 is spherically shaped. The image grid 38 includes a plurality of viewpoints 40 about its perimeter. Each viewpoint 40 is an area of the image grid 38. In the embodiment of FIG. 5, the viewpoints 40 are shown as rectangles or squares. The viewpoints 40 do not necessarily need to be uniform or the same shape. The viewpoints 40 can be located inside the image grid 38 as well. That is, multiple columns of viewpoints 40 can form one or more inner layers of the image grid 38 that is closer to the target object than viewpoints 40 at the perimeter of the image grid 38. Depending on the density of viewpoints 40, the viewpoints 40 may share an edge. Density can depend on the number of images that are available for a common target object and time period. In an embodiment having a low density image grid 38, the viewpoints 40 are spaced apart and do not share an edge.

The image grid 38 is based on a time period and is time period-specific. The time period may be based on one or more image parameters. The time period can be a single moment in time or can be a range of time with a start point and an endpoint. The time period for the grid 38 may be assigned a time variance to define a tolerance for images differing from one another by capture time. The amount of time variance depends on the amount of movement at the target object's location or movement of the target object. The tolerance for time variance may be set accordingly. For example, if the target object is of a landmark, the variance can be significantly larger than time variance for a sports event. The time variance may be user defined or may be predetermined and set based on labels or tags of the target object. The time variance may also be determined by image analysis that determines substantial differences in images of a target object.

FIG. 5 illustrates viewpoint 40A that is an image captured at an altitude slightly higher than viewpoint 40B but substantially the same latitude as viewpoint 40B. Viewpoint 40C is an image captured at an altitude slightly lower than viewpoint B but substantially the same latitude as viewpoint 40B. The viewpoint synthesizer module 36 assigns the image to a viewpoint 40 on the image grid 38 based on the analyzing/grouping/soiling/classifying of the image synthesizer module 32 and/or the image parameters, preferably embedded within the image.

The viewpoint synthesizer module 36 generates a display of the viewpoint's image. The user may select a desired viewpoint 40 to display with the user interface of the interface device 2. An enlarged image, relative that displayed on image grid 38, of the viewpoint 40 is generated on the interface device 2 for viewing. The user may select two or more desired viewpoints 40 with the user interface of the interface device 2. Referring to FIG. 5, viewpoints 40A, 40B and 40C are selected. The viewpoint synthesizer module 36 synthesizes the viewpoints 40A, 40B and 40C to provide a sequenced display of the images assigned to viewpoints 40A, 40B and 40C. The sequenced display can be displayed in the order of viewpoints 40 selected, in order of from highest altitude to lowest altitude, or largest latitude to smallest latitude. A diagonal sequence of viewpoints 40 can also be displayed. For a sequenced display in order of viewpoints 40 selected, the viewpoints 40 do not necessarily need to be located proximal (juxtaposed) to one another. For example, the user can select viewpoints 40A, 40B and 40D. The viewpoint synthesizer module 36 then generates a sequenced display of images taken substantially proximal to one another (40A, 40B) and then an image taken farther away (40D). The effect of the sequenced display shows views of the target object close to one another and then a jump to a remote view of the target object.

The user may select viewpoints 40 with the interface device 2. With an interface device 2 having a touch screen display, the user may draw a viewpoint path 41 with a finger by sliding the finger across the display to connect desired viewpoints for viewing.

Figure 6:
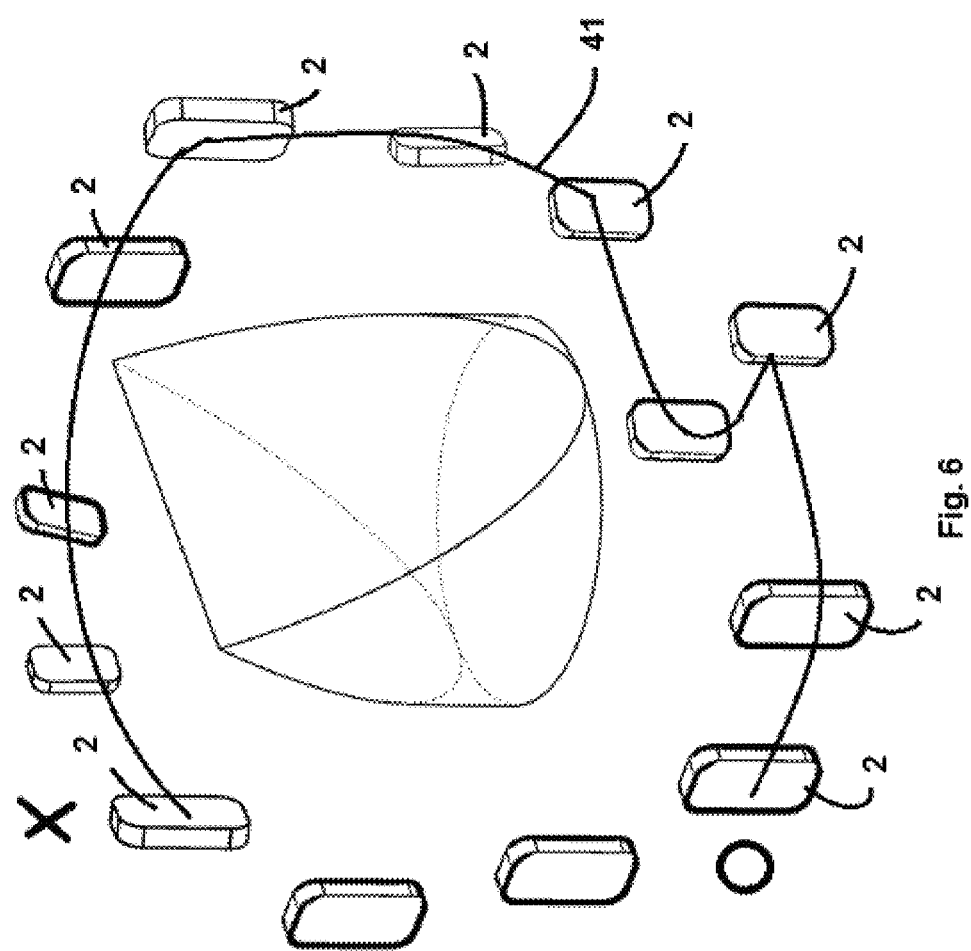
FIG. 6 is a schematic view of positions of image capturing devices about a target object and a viewpoint path about the target object according to an embodiment of the present invention.

Referring to FIG. 6, example positions of interface devices 2 are illustrated around a target object. A user may select images from the planar image grid 38 to create a viewpoint path 41 around the target object by utilizing images captured by interface devices 2 at various positions. For example, a viewpoint path 41 may be created by selecting viewpoints 40 on the image grid 38 from interface devices 2 around the target object in a viewpoint path 41 starting at O and ending at X.

Figure 7:
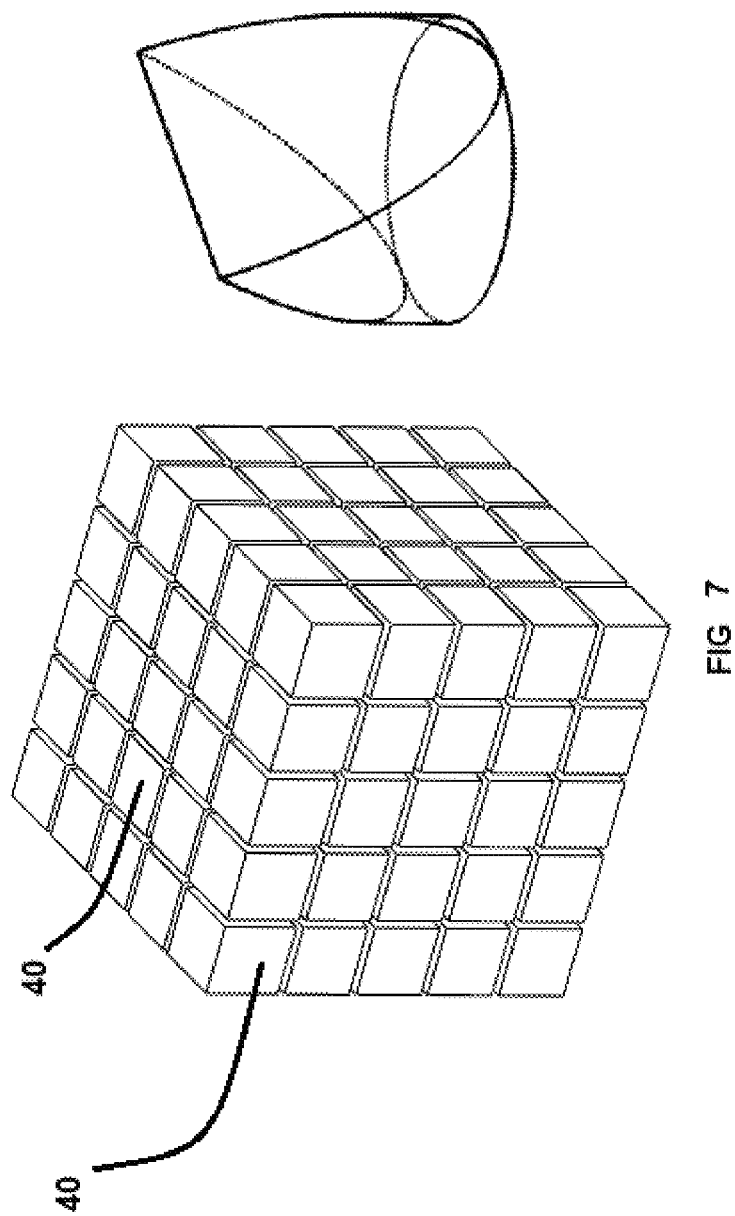
FIG. 7 is a view of a planar image grid with multiple viewpoints according to an embodiment of the present invention.
Figure 8:
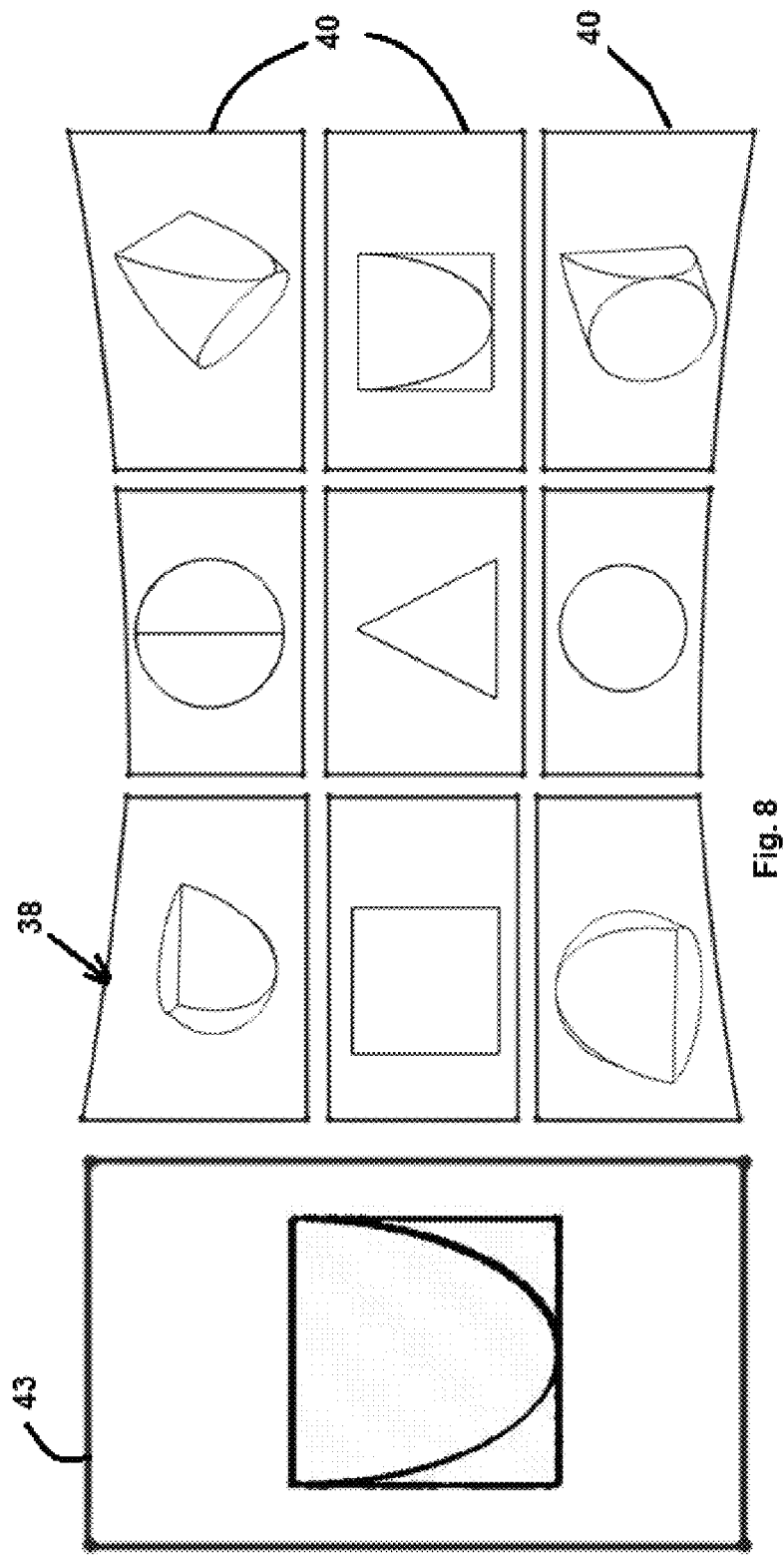
FIG. 8 is a schematic view of a planar image grid with an editing box according to an embodiment of the present invention.

Referring to FIG. 7, the image grid 38 can be planar. Viewpoints 40 in the planar image grid 38 are selected by the user to create a display sequence. As with the spherical image grid 38 of FIG. 5, inner layers of viewpoints 40 can be provided. The columns of viewpoints 40 in the inner layers represent views closer to the target object than the viewpoints 40 at the perimeter. Referring to FIG. 8, an example user interface of the interface device 2 for a user to create the viewpoint path 41 on a single layer planar image grid 38 is illustrated. The user interface is generated by the grid generation component 26. The user may touch the desired viewpoint 40 and drag into an adjacent editing box 43. The viewpoint synthesizer module 36 is configured to combine images dragged into the editing box 43. That is, the viewpoint synthesizer module 36 is configured to tack images from dragged viewpoints 40 together. In the case of the viewpoint 40 dragged into the editing box 43 being a video, the viewpoint synthesizer module 36 may provide the user, via the user interface, with the option of selecting a portion(s) of the video (i.e. creating a clip).

The viewpoint synthesizer module 36 is configured to allow the user, via the user interface, to control the switch to the next image in the viewpoint path's 41 sequenced display of viewpoints 40. Alternatively, the switch may occur after a predetermined time lapse. The user may set the predetermined time lapse. In the case where the image is a video, the video does not necessarily need to play until the end point before displaying the next image in the displayed sequence. The user may switch to the next image (e.g. video) at any time or the switch may occur after a predetermined time lapse. The viewpoint synthesizer module 36 can generate a display of an image transition. The image transition is displayed during the switch to the next image in the display sequence. The image transition may be defined by the user by providing selection capabilities such as those transitions offered by Microsoft PowerPoint. In the case of video, the image transition can provide the visual effect of rotation about the target object. In one embodiment, the viewpoint synthesizer module 36 interpolates between the images (video) to provide rotation of the displayed view to provide such visual effects as time-slice effect or bullet time effect.

Figure 9:
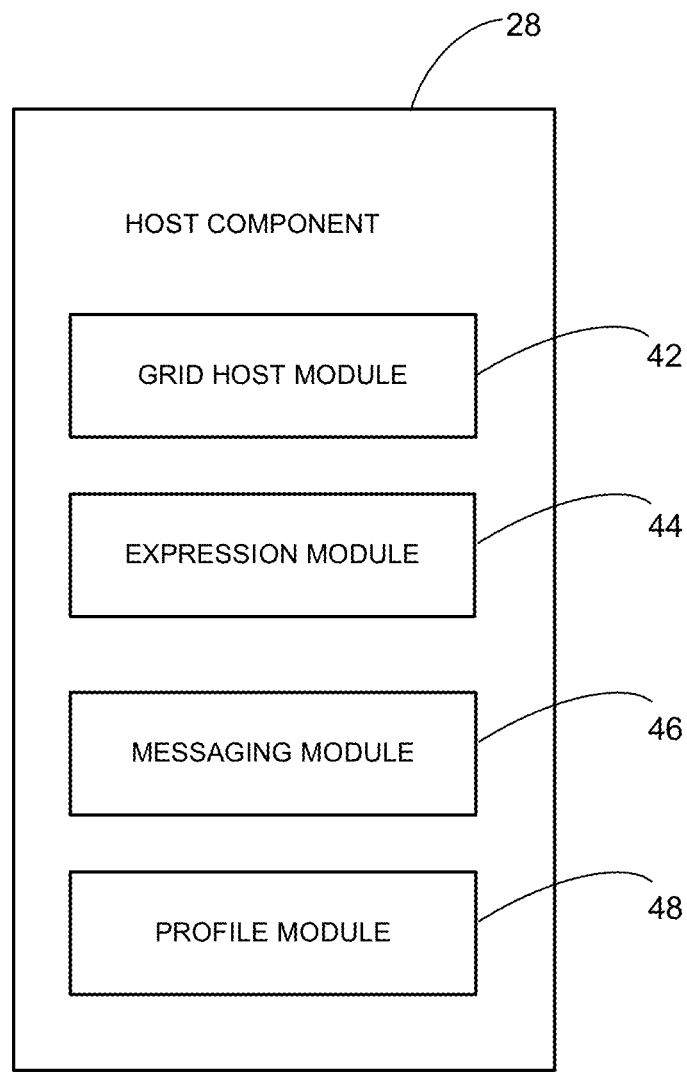
FIG. 9 is a block diagram of a host component of the image grid system of FIG. 1 according to an embodiment of the present invention.

FIG. 9 illustrates the host component 28 according to an example embodiment.

The host component 28 includes a grid host module 42, an expression module 44, a messaging module 46 and a profile module 48. The modules 42, 44, 46, 48 provide the capabilities of a social networking site.

The grid host module 42 provides a "room" for users to access the image grid 38 and select viewpoints 40. The "room" may be image-grid-specific or may host multiple image grids 38 with shared features, for example.

The expression module 44 provides the functionality for the users of a social networking site to express themselves. The expression module 44 allows tagging, labeling, commenting, followers and marking (e.g. "like" an image or grid). The image can be altered with visual effects such as invert, sepia, black and white, grainy, etc.

The messaging module 46 enables messaging functions for communication between users. The messaging module 46 may include a POP messaging arrangement, for example.

The profile module 48 provides the framework for users to set up and modify user profiles. The profile module 48 can provide user profile webpages, where a user can modify the user profile, send messages, label or comment on images, label or comment on image grids, display image grids or links to image grids, "like" images or image grids, etc.

Figure 10:
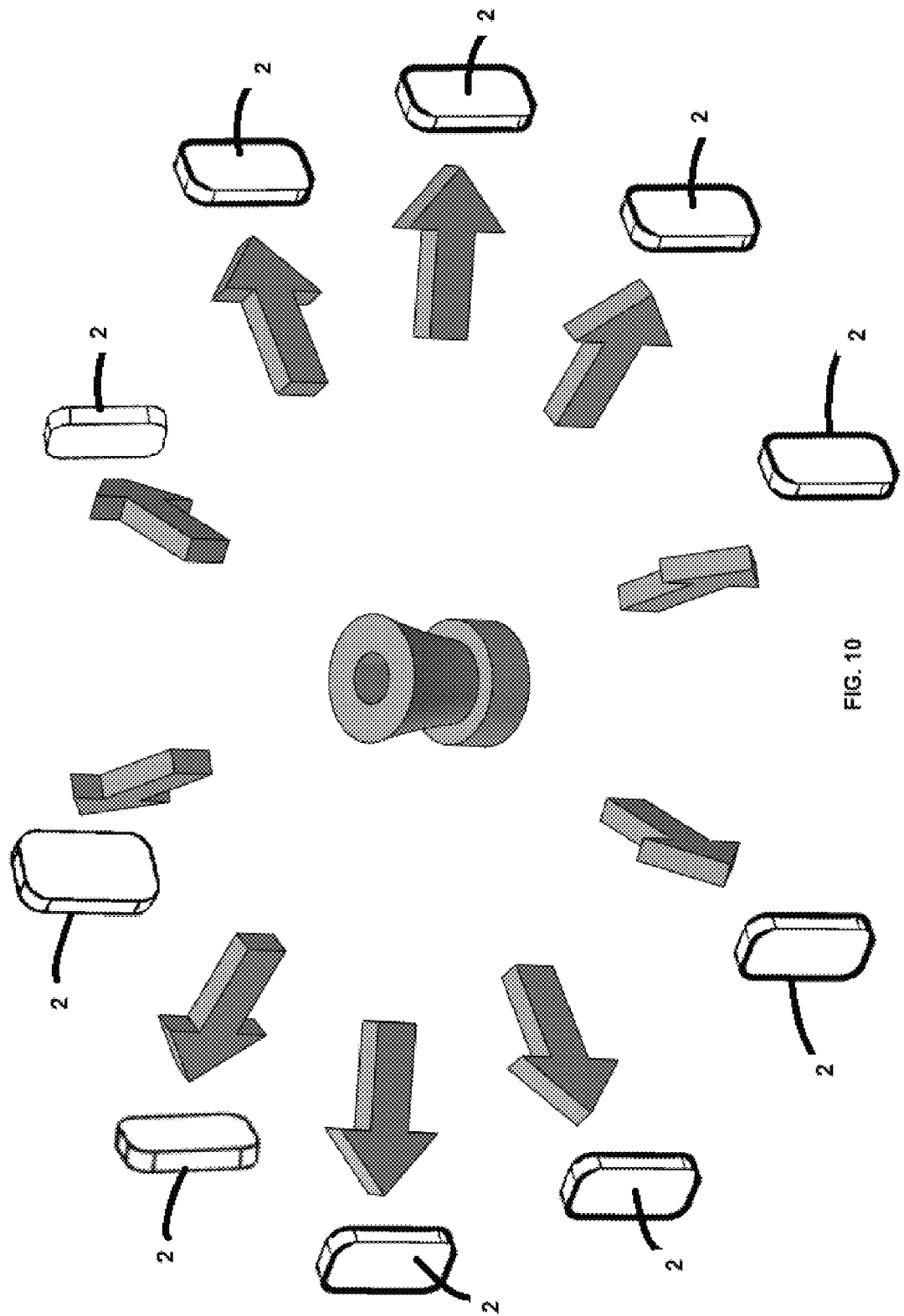
FIG. 10 is a schematic view of positions of image capturing devices about a target object for capturing a sound source from different locations according to an embodiment of the present invention.

FIG. 10 illustrates utilizing the interface device 2 as an audio receiver to utilize the image grid system 1 to generate a surround sound or substantially mimic a sound effect in a concert hall. When the image includes video, sound may be played separately from the video. That is, audio from the video is exclusively played. Audio alone (without video) may be recorded with the interface device 2 at various positions, such as those shown in Fig. As used herein, audio means sound recorded in video or recorded alone as sound file/recording.

Parameters, such as the image parameters described above, may be associated with the audio recordings from the interface devices 2. The relational component 24 may determine relationships of the audio recordings from the interface devices 2 and analyze the audio to associate the audio recordings. The grid generation component 26 may generate an image grid 38 for the audio recordings, populating the viewpoints 40 with audio recordings instead of images. Thus, a dimensional composite of sound can be provided. That is, the recorded sounds may be played at substantially the same time, simultaneously, sequentially or may be staggered to form a melody-like playback by selecting viewpoints 40 for playback. The viewpoints 40 may be selected and audio played by the user as described above for selecting viewpoints 40 and displaying images.

Figure 11:
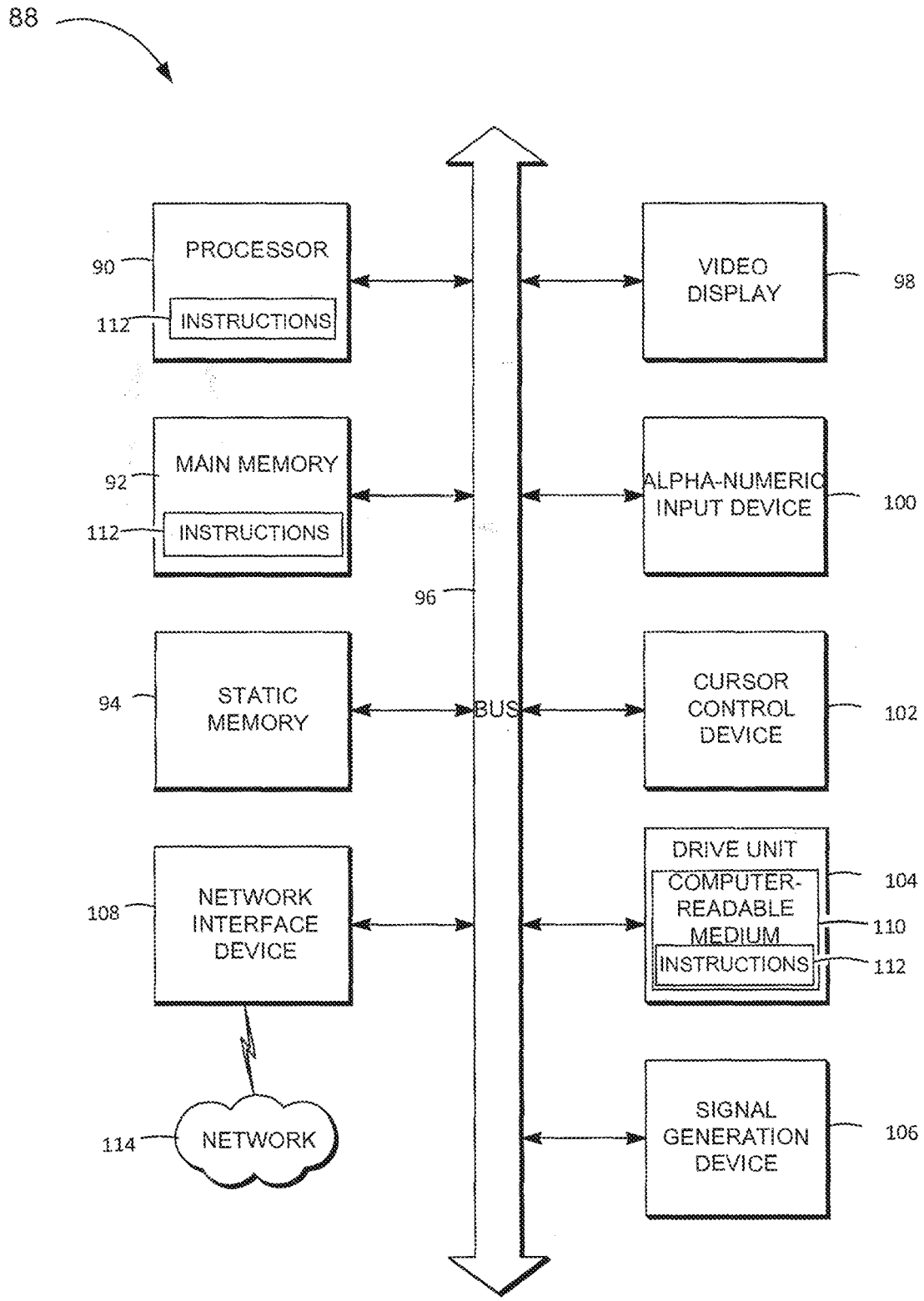
FIG. 11 is a block diagram of a machine in the example form of a computer system within which a set of instructions for causing the machine to perform any one or more of the methodologies discussed herein may be executed or stored.

FIG. 11 shows a block diagram of a machine in the example form of a computer system 88 within which a set of instructions may be executed causing the machine to perform any one or more of the methods, processes, operations, or methodologies discussed herein. The interface device 2, the network manager device 8, and/or the application provider device 10 may include the functionality of one or more computer systems 88.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 88 includes a processor 90 (e.g., a central processing unit (CPU) a graphics processing unit (GPU) or both), a main memory 92 and a static memory 94, which communicate with each other via a bus 96. The computer system 88 further includes a video display unit 98 (e.g., a liquid crystal display (LCD) or a cathode ray tube (CRT)). The computer system 88 also includes an alphanumeric input device 100 (e.g., a keyboard), a cursor control device 102 (e.g., a mouse), a drive unit 104, a signal generation device 106 (e.g., a speaker) and a network interface device 108.

The drive unit 104 includes a computer-readable medium 110 on which is stored one or more sets of instructions (e.g., software 112) embodying any one or more of the methodologies or functions described herein. The software 112 may also reside, completely or at least partially, within the main memory 92 and/or within the processor 90 during execution thereof by the computer system 88, the main memory 92 and the processor 90 also constituting computer-readable media.

The software 112 may further be transmitted or received over a network 114 via the network interface device 108.

While the computer-readable medium 110 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An image grid system comprising:
    a network manager device configured to communicatively connect to an interface device and to receive images, the network manager device having:
    a relational component configured to determine at least one relationship among two or more images from the interface device, analyze the two or more images to associate at least one character common to the images, modify and combine the images that share at least one common character,
    a grid generation component configured to generate an image grid with a plurality of viewpoints about the image grid and simultaneously populate the viewpoints with the two or more combined images based on the determined relationship and association of the two or more combined images, the grid generation component being further configured to generate a display of the image grid; and
    a database communicatively connected to the network manager device, the database storing the images, image relationships, image associations and/or image parameters.

2. The image grid system of claim 1, wherein the determined relationship is based on one or more image parameters from each of the images.

3. The image grid system of claim 2, wherein the image parameter comprises one or more of time, date, geocoordinates, altitude, target object, magnification or type of image capture device.

4. The image grid system of claim 3, wherein the geocoordinates comprise GPS coordinates, latitude coordinates, longitude coordinates and/or altitude.

5. The image system of claim 2, wherein an image grid generation comprises a determining of the shape of the image grid according to an environment in which a target object of one or more of the images is located.

6. The image grid system of claim 5, wherein the environment is determined from the image parameters.

7. The image grid system of claim 5, wherein the shape of the image grid comprises a sphere.

8. The image grid system of claim 5, wherein the shape of the image grid comprises a multiple layers.

9. The image grid system of claim 5, wherein the shape of the image grid comprises a single-layer plane.

10. The image grid system of claim 2, wherein the image parameters comprise a time period upon which the image grid is based.

11. The image grid system of claim 1, wherein the grid generation component is configured to generate a display of an enlarged image, relative that displayed on the image grid at the viewpoint, when the viewpoint is selected by a user.

12. The image grid system of claim 1, wherein the grid generation component is configured to provide a display of images in multiple viewpoints in an order, and the order is according to an order of viewpoints selected by the user.

13. The image grid system of claim 12, wherein the order of viewpoints selected by the user comprises a viewpoint path of viewpoints, and the viewpoint path is a path of viewpoints about a target object.

14. The image grid system of claim 12, wherein the order of viewpoints selected by the user comprises a viewpoint path of viewpoints selected using a touch screen and an editing box on the touch screen.

15. The image grid system of claim 14, wherein video clip editing options are provided to the user.

16. The image grid system of claim 1, wherein the network manager device further includes a host component configured to host a social networking platform with user profiles, messaging, image tagging and/or commenting.

17. A method comprising the steps of:
    receiving in a network manager device a plurality of images from at least one image capture device;
    determining in the network manager device at least one relationship among two or more of the images;
    analyzing the two or more images in the network manager device to associate at least one characteristic of the two or more Images;
    generating an image grid in the network manager device with a plurality of viewpoints about the image grid; and
    populating the viewpoints in the network manager device with the two or more images based on the determined relationship and association of the two or more images.

18. The method of claim 17, wherein the generating step comprises determining a shape of the image grid according to an environment in which a target object of one or more of the images is located.

19. The method of claim 17, wherein the generating step comprises providing a display of images in multiple viewpoints in an order, and the order is according to an order of viewpoints selected by the user.

20. The method of claim 17, wherein the generating step comprises providing a display of images according to the user selecting a viewpoint path of viewpoints, and the viewpoint path is a path of viewpoints about a target object.

* * * * *